United States Patent [19]
Myers

[11] Patent Number: 5,708,580
[45] Date of Patent: Jan. 13, 1998

[54] VIDEO SIGNAL STABILIZATION

[75] Inventor: Howard M. Myers, Greensboro, N.C.

[73] Assignee: Gilbarco, Inc., Greensboro, N.C.

[21] Appl. No.: 399,174

[22] Filed: Mar. 6, 1995

[51] Int. Cl.$^6$ .............................. G05B 13/02; H04N 5/52
[52] U.S. Cl. .................. 364/148; 364/157; 348/678; 348/683
[58] Field of Search .................. 364/479.01, 148–157; 330/250, 254, 278, 279; 348/684, 682, 683, 525, 532, 505; 327/50, 72; 380/10, 15

[56] References Cited

U.S. PATENT DOCUMENTS

| 3,936,599 | 2/1976 | Peil et al. ............... 178/7.3 |
| 4,544,896 | 10/1985 | Osawa et al. ............. 330/284 |
| 4,654,891 | 3/1987 | Smith ..................... 455/617 |
| 5,361,216 | 11/1994 | Warn et al. . |
| 5,379,075 | 1/1995 | Nagasawa et al. ......... 348/678 |

OTHER PUBLICATIONS

Elantec EL4583C Data sheet, Nov. 1993 Rev. A.

Primary Examiner—Paul P. Gordon
Assistant Examiner—Thomas E. Brown
Attorney, Agent, or Firm—Rhodes Coats & Bennett, L.L.P.

[57] ABSTRACT

An apparatus for stabilizing an unmodulated video signal that has a sync tip voltage includes an amplifier for amplifying the video signal according to a control voltage, a transistor receiving the amplified video signal from the amplifier on the base of the transistor and outputting the amplified video signal on the collector, a sync tip voltage detector connected to the emitter of the transistor for detecting the sync tip voltage in the video signal and outputting a voltage derived from the sync tip voltage, an integrator having three inputs, one of which is the voltage derived from the sync tip voltage and another of which is a reference voltage and an output to the amplifier as the control voltage, a stabilization loop including a low current detector that detects low current levels in the amplified video signal through an optical coupler to a resistive element and a pulse stretcher that outputs a signal to the third input of the integrator, whereby the sync tip voltage detector, integrator and amplifier cooperate to stabilize the video signal in most circumstances, and the stabilization loop prevents video signal voltage from increasing to too high a level for the sync tip voltage detector.

18 Claims, 3 Drawing Sheets

VIDEO SIGNAL STABILIZATION

BACKGROUND OF THE INVENTION

The present invention is useful for stabilizing video signals. For example, the circuit is advantageously used as a adjunct to the video transmission equipment described in U.S. patent application Ser. No. 08/237,148 filed May 3, 1994 entitled "Audio and Video Information Transmission for a Fuel Station Store to a Fuel Pump Communication Unit" by Walter T. Shuler et al. The entire disclosure of that application is incorporated herein by reference. In that application, the signal is transmitted to a fuel dispenser to permit a video screen on the dispenser to show video signals.

In the system described in that U.S. patent application, a combined unmodulated video and modulated audio signal is sent to a receiver input by way of a twisted pair without a carrier or modulation. As a result, the unmodulated signal is available for video display. The length of twisted pair will vary depending upon the location of the dispenser relative to the transmitter generally located in the station. Variation in length will cause some variation in the received signal strength at the receiver input. Therefore, there will be variation from dispenser to dispenser and also from station to station. Additionally, there will be a tendency for variations to occur over time for various reasons. Signals from different sources and signals recorded at different time may vary. Also, the components may drift somewhat over time causing additional changes.

Traditional video AGC (automatic gain control) circuits use the recovered voltage level of the radio frequency carrier to control the gain, the goal being to produce a normalized video output. This works well for television. In the unmodulated video signal system, however, there is no radio frequency video carrier to provide this reference. Therefore, an alternate way is needed to provide this function.

SUMMARY OF THE INVENTION

The present invention fulfills this need in the art by providing an apparatus for stabilizing a video signal having a sync tip voltage including an amplifier for receiving and amplifying the video signal according to a control voltage, a sync tip voltage detector for detecting the sync tip voltage in the video signal and outputting a voltage derived from the sync tip voltage, an integrator having three inputs, one of which is the voltage derived from the sync tip voltage and another of which is a reference voltage and an output to the amplifier as the control voltage, a stabilization loop that detects low current levels in a circuit passing the amplified video signal and outputs a signal as the third input to the integrator, whereby the sync tip voltage detector, integrator and amplifier cooperate to stabilize the video signal in most circumstances, and the stabilization loop prevents video signal voltage from increasing to too high a level for the sync tip voltage detector.

In a preferred embodiment the amplifier outputs to a transistor base, the emitter of which is applied as the input to the sync tip voltage detector and from the collector of which the stabilized video signal is derived. The collector may be connected to an optical coupler to provide signal isolation.

Preferably, the stabilization loop detects low current levels through the optical coupler. The stabilization loop may include a resistive element, a low current detector and a pulse stretcher.

Typically, the video signal is free of a carrier modulation.

The invention also provides a method of stabilizing a video signal having a sync tip voltage including amplifying the video signal according to a control voltage, detecting the sync tip voltage in the video signal and outputting a voltage derived from the sync tip voltage, comparing the voltage derived from the sync tip voltage with a reference voltage and an outputting a ramping voltage as the control voltage when the voltage derived from the sync tip voltage is unequal to the reference voltage, and detecting current levels in the amplified video signal and, as a consequence of low current detection, outputting a signal to cause the output of a ramping voltage to reduce the gain of the amplification of the video signal, thereby stabilizing the video signal.

The method may include isolating the amplified video signal through optical coupling. The detecting step typically includes detecting low current levels through the optical coupling. The detecting step may include detecting a current through a resistive element and pulse stretching the output of a detected low current.

The invention also provides a fuel dispenser for dispensing fuel and showing video images to a fuel customer including a fuel dispensing apparatus including a video screen, a video transmission line to the fuel dispensing apparatus for transmitting a video signal without a carrier frequency, an amplifier for receiving and amplifying the video signal according to a control voltage, a synchronization signal detector for detecting a video level in the video signal and outputting a voltage representative of the video level, an integrator having three inputs, one of which is the voltage representative of the video level and another of which is a reference voltage and an output to the amplifier as the control voltage, a stabilization loop that detects low current levels in a circuit passing the amplified video signal and outputs a signal as the third input to the integrator, whereby the synchronization signal detector, integrator and amplifier cooperate to stabilize the video signal in most circumstances, and the stabilization loop prevents video signal voltage from increasing to too high a level for the sync tip voltage detector. For example, the color burst signal could also be used as an indicator of video level.

BRIEF DESCRIPTION OF THE DRAWINGS

The invention will be better understood after a reading of the Detailed Description of the Preferred Embodiments and a review of the drawings, in which.

DETAILED DESCRIPTION OF THE PREFERRED EMBODIMENTS

Figure 2:
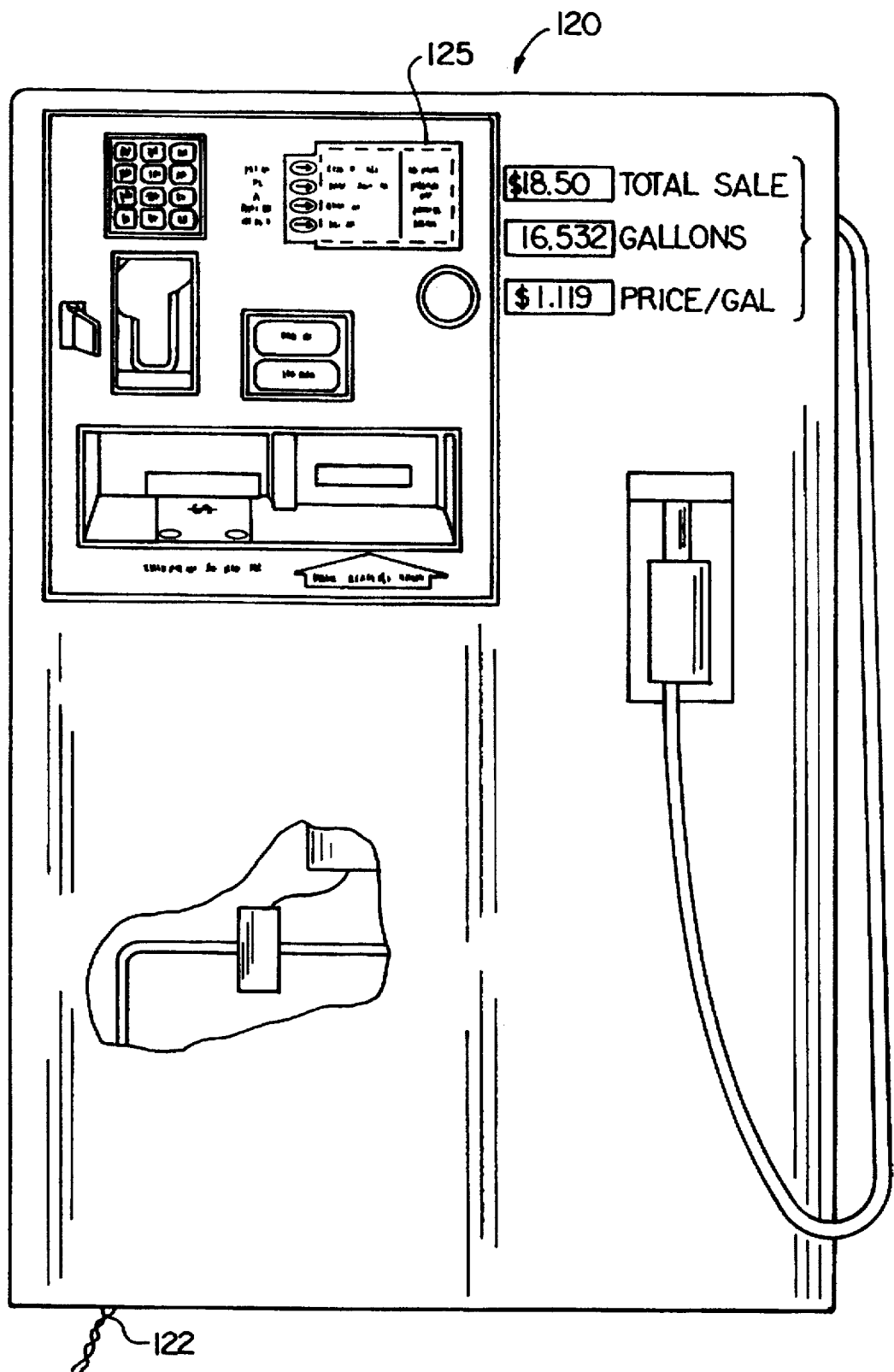
FIG. 2 is an elevation of a fuel dispenser having a video screen according to a preferred embodiment of the invention.
Figure 2A:
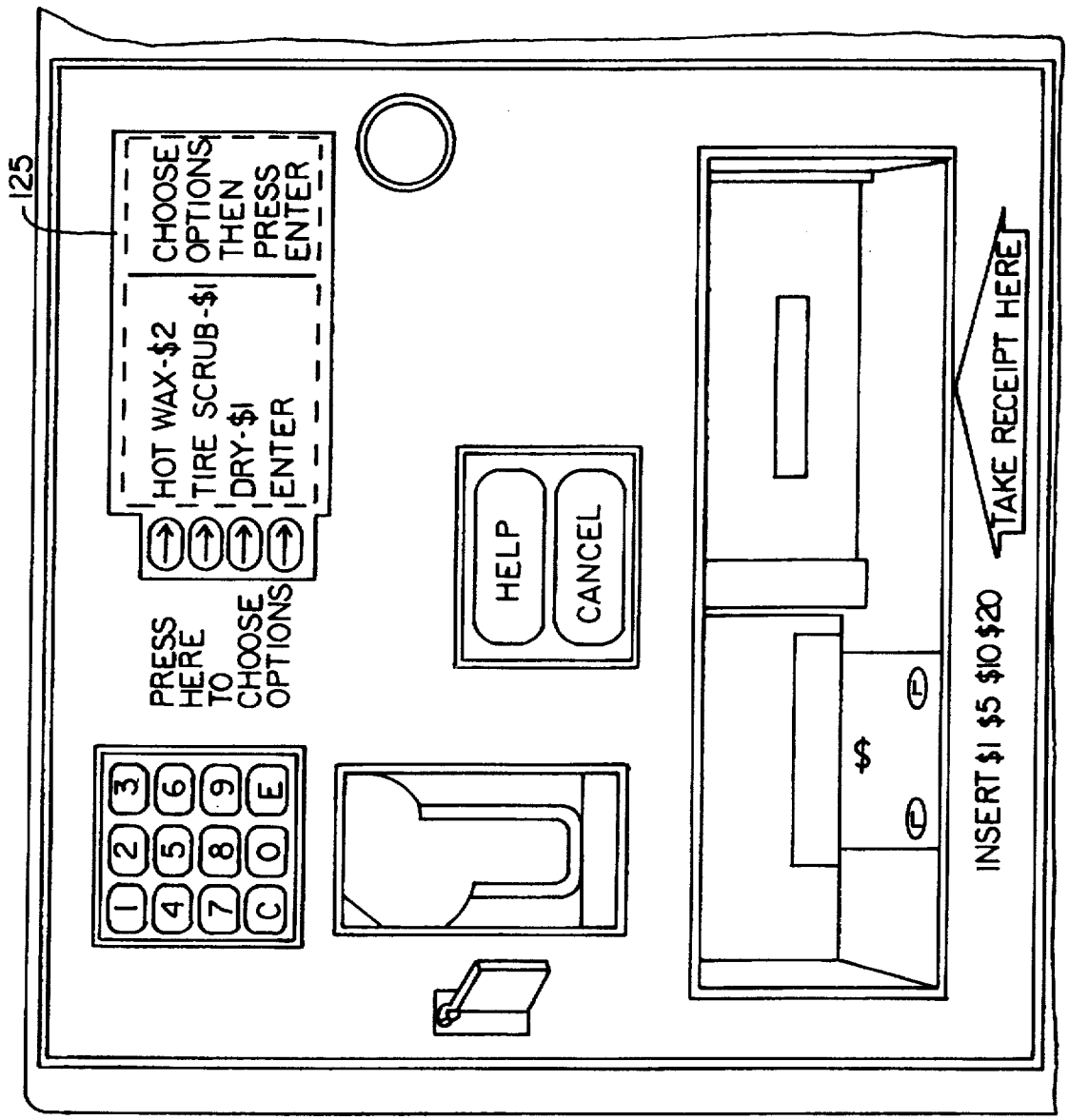
FIG. 2A is an enlarged depiction of the user interface portion of the fuel dispenser shown in FIG. 2.

Referring first to FIGS. 2 and 2A, a fuel dispenser 120 has a video screen 125 to show advertisements, fueling instructions or other information to a customer. The dispenser 120 is supplied with a video signal, perhaps from a station kiosk, over twisted pair 122. Details of the transmission of the video and accompanying audio are disclosed in U.S. patent application Ser. No. 08/237,148 filed May 3, 1994 entitled "Audio and Video Information Transmission for a Fuel Station Store to a Fuel Pump Communication Unit" by Walter T. Shuler et al.

3

Figure 1:
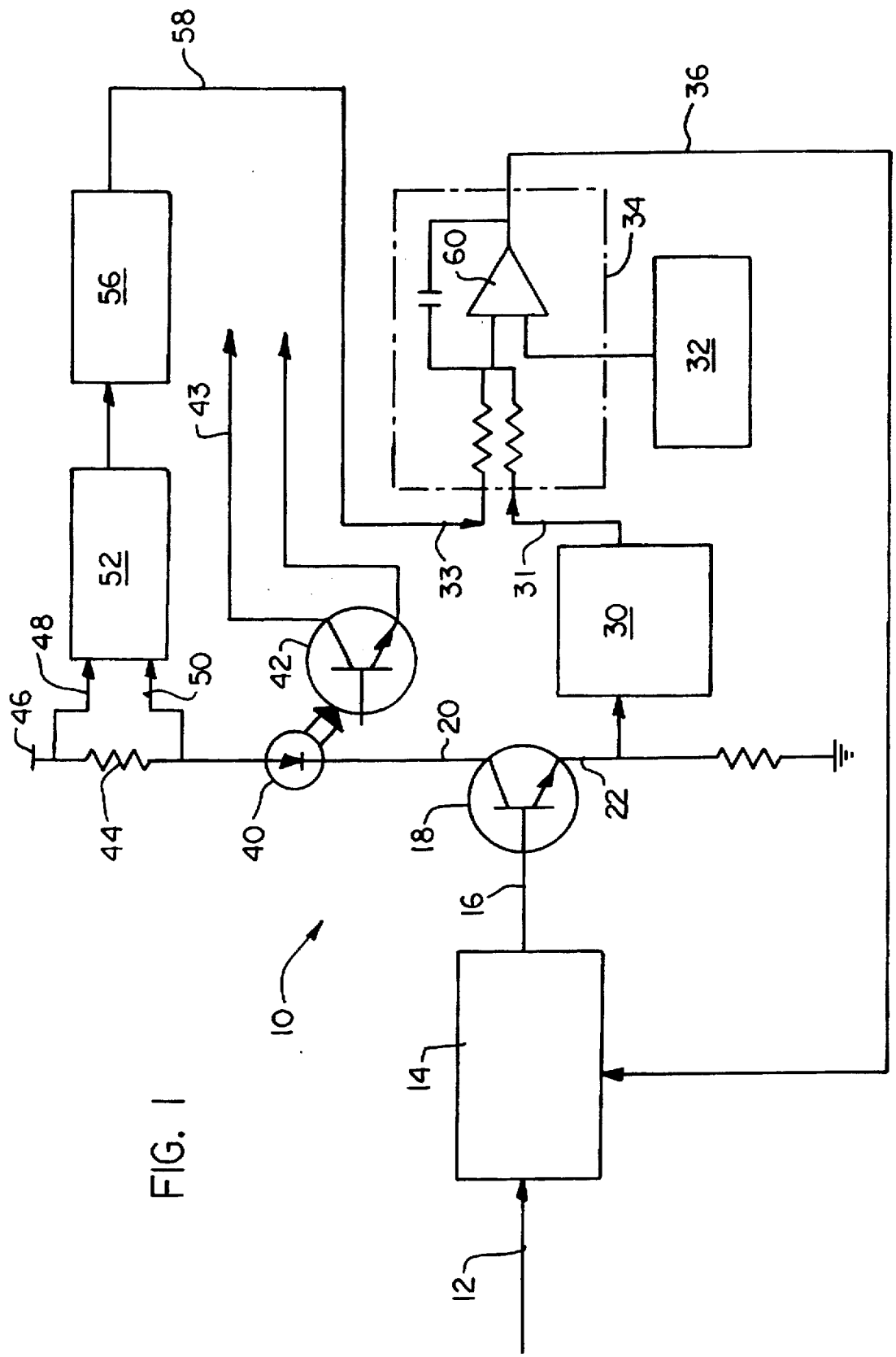
FIG. 1 is a schematic block diagram of the circuit according to a preferred embodiment.

According to a preferred embodiment, the present invention adds a circuit depicted in FIG. 1 to handle the video signal received by the dispenser 120. The circuit adjusts the receiver from end gain based on the voltage level of the video sync tip voltage. The sync tip voltage is the amplitude of the voltage pulse which is used to carry the timing information for synchronizing the receiver sweep circuits. This voltage is not subject to change with the video content, so therefore is a useful yardstick for video signal strength when no carrier is involved. In the invention, the sync tip voltage is normalized to a constant level by a feedback path which adjusts the gain of a preceding voltage-controlled amplifier. Normalizing the sync tip levels also normalizes the video levels on a consistent scale so that the video output level is relatively constant in spite of changes in input level. This is the essence of the AGC function.

A standard integrated circuit recovers the sync tip voltage level from the amplified signal but is designed to operate with a limited range of input voltages. As a result, some situations tend to cause this basic control system to lose control, particularly when the input signal is suddenly applied, removed, or otherwise changed suddenly. In these situations, various modes of instability can arise which will cause the basic system to oscillate, disturbing or destroying the video signal. The system has a difficult time recovering from these conditions without outside help.

The basic control system has two control loops. The basic control loop starts at the video input 12, through the voltage controlled amplifier 14, into the sync tip voltage detector 30, into the input 31 of the integrator 34, and back to the voltage controlled amplifier 14. The amplifier 14 can be suitably provided as a chip-styled AD603. The output of that chip can be applied as the input to the base 16 of the transistor 18, with a suitable base bias voltage configuring circuit. A suitable configuration for that biasing circuit will be readily apparent to those of ordinary skill in the art. The sync tip voltage detector 30 is preferably an EL4583C Video Sync Separator available from Elantec Company. The video level could also be noted from the color burst portion of the video signal and acted on similarly.

This basic control loop attempts to regulate the sync tip voltage at the emitter 22 of the transistor 18. The second loop starts at the low current detector 52, to the pulse stretcher 56, into the input 33 of the integrator 60, to the voltage controlled amplifier 14, and back to the low current detector. This loop attempts to override the first control loop to maintain the current of LED 40 into collector 20 of transistor 18 above a nominal low level.

The light-emitting diode 40 is the front end of an optical coupling including phototransistor 42. The LED 40 and phototransistor 42 can conveniently be packaged together in a known chip identified as HCPL4562.

The low current detector can take the form of staged transistors with a Baker clamp network on the input on the first stage of the first transistor. The output of the low current detector so configured will be a short pulse of current. The pulse can be stretched over time in any suitable fashion, such as an RC circuit. The output of that RC circuit can then be tied to the input 33 of the integrator.

The first loop (AGC loop) uses the sync tip voltage recovered from the sync tip voltage detector 30 to vary the gain of the voltage controlled amplifier 14 at the front end under control of the integrator 34. The control voltage from the integrator 34 will vary amplifier gain to maintain a recovered level at 31 which matches the reference voltage 32. In this circuit, the reference 32 is set to approximately

4

0.7 volts, although other values can be used as long as they represent meaningful outputs from the sync detector 30. As video input increases, the control voltage decreases to maintain 31 at 0.7 volts. The LED current will have a corresponding relationship to the emitter voltage, thereby providing an isolated, regulated video output at the phototransistor 42 output. The AGC loop is in control during normal operation.

The second loop is derived from the LED side of the optical isolation circuit and serves to keep the control system from going unstable. Under some conditions (particularly when the input circuit is operating at high gain), the sync tip detector 30 gets confused and recovers invalid information from an invalid input. Normally, the LED 40 operates at a few milliamperes DC bias, and the video signal swings the current above and below the DC bias point. Excessive video drive to the LED drive circuit will result in excursions in LED current towards zero, which will cause a severe distortion of the signal at the isolated output and will also lead to a loss of sync by the sync detector 30. To avoid this problem, the optical coupler LED 40 current is monitored for a low level condition. When low LED current (representing too much gain) is detected and stretched by the pulse stretcher 56, the gain control block (integrator 34) is quickly given a correction signal which decreases the gain. The second loop comes into play typically during sudden changes in video input level, or when there is no video input.

The addition of the second loop provides the following effects:

(1) If the incoming video signal suddenly gets stronger, tending to exceed the upper voltage limit of the sync detector, the LED current monitor quickly takes control of the gain control circuit and limits the gain so that the output drive level stays in the operating range for the LED and also for the sync tip detector.

(2) If the incoming video signal is disconnected, the basic AGC gain tends to go to the maximum value. The LED current detector limits the gain to the point which approaches the activation of the low current detector. If the signal were reapplied with the circuit at maximum gain, it would tend to overdrive the front-end amplifier 14 and the sync tip detector 30. The low current detector 52, in effect, keeps the system on track by detecting overdrive and steadily reducing gain to remove it.

(3) The control voltage to the voltage-controlled amplifier 14 is kept in control at all times, even if there is no video input signal. Without the second loop, the AGC function would typically have an unrecoverable failure when the input signal went away entirely.

In summary, when video is present, the video sync tip level 31 is the primary input parameter, and it is used as a basis for controlling the circuit gain. When low LED current is detected (indicating too much gain), the primary goal is to override the system and reduce the gain to quickly get rid of the low current condition (and excessive gain), and then resume normal operation based on sync tip level.

Those of ordinary skill in the art will appreciate that the invention can be carried out in many suitable fashions, not specifically enumerated herein. All such variations are deemed to be within the scope hereof.

What is claimed is:

1. An apparatus for stabilizing a video signal having a sync tip voltage comprising an amplifier for receiving and amplifying the video signal according to a control voltage, a sync tip voltage detector for detecting the sync tip voltage in the video signal and outputting a voltage derived from the sync tip voltage, an integrator having three inputs, one of which is the voltage derived from the sync tip voltage and another of which is a reference voltage and an output to said amplifier as said control voltage, a stabilization loop that detects high gain levels for the amplified video signal in a circuit passing the amplified video signal and outputs a signal as the third input to said integrator, said sync tip voltage detector, integrator and amplifier cooperate to stabilize the video signal in most circumstances, and said stabilization loop prevents video signal voltage from increasing to too high a level for said sync tip voltage detector.

2. An apparatus as claimed in claim 1 wherein said amplifier outputs to a transistor base, the emitter of which is applied as the input to said sync tip voltage detector and from the collector of which the stabilized video signal is derived.

3. An apparatus as claimed in claim 2 wherein said collector is connected to an optical coupler to provide signal isolation.

4. An apparatus as claimed in claim 3 wherein said stabilization loop detects low current levels through said optical coupler, the low current levels indicating the high gain levels for the amplified video signal.

5. An apparatus as claimed in claim 4 wherein said stabilization loop includes a resistive element, a low current detector and a pulse stretcher.

6. An apparatus as claimed in claim 1 wherein said amplifier output is connected to an optical coupler to provide signal isolation.

7. An apparatus as claimed in claim 6 wherein said stabilization loop detects low current levels through said optical coupler.

8. An apparatus as claimed in claim 1 wherein said stabilization loop includes a resistive element, a low current detector and a pulse stretcher.

9. An apparatus as claimed in claim 1 wherein said video signal is free of a carrier modulation.

10. An apparatus for stabilizing an unmodulated video signal that has a sync tip voltage comprising an amplifier for receiving and amplifying the video signal according to a control voltage, a transistor having an emitter, a collector and a base receiving the amplified video signal from said amplifier on the base of the transistor and outputting the amplified video signal on said collector, a sync tip voltage detector connected to the emitter of said transistor for detecting the sync tip voltage in the video signal and outputting a voltage derived from the sync tip voltage, an integrator having three inputs, one of which is the voltage derived from the sync tip voltage and another of which is a reference voltage and an output to said amplifier as said control voltage, a stabilization loop including an optical coupler receiving the amplified video signal from said transistor collector to provide signal isolation, a low current detector that detects low current levels in the amplified video signal through said optical coupler to a resistive element and a pulse stretcher that outputs a signal to the third input of said integrator, whereby said sync tip voltage detector, integrator and amplifier cooperate to stabilize the video signal in most circumstances, and said stabilization loop prevents video signals voltage from increasing to too high a level for said sync tip voltage detector.

11. A method of stabilizing a video signal having a sync tip voltage comprising amplifying the video signal according to a control voltage, detecting the sync tip voltage in the video signal and outputting a voltage derived from the sync tip voltage, comparing the voltage derived from the sync tip voltage with a reference voltage and an outputting a ramping voltage as the control voltage when the voltage derived from the sync tip voltage is unequal to the reference voltage, and detecting high gain levels for the amplified video signal and, as a consequence of a high gain level detection, outputting a signal to cause the output of a ramping voltage to reduce the gain of the amplification of the video signal, thereby stabilizing the video signal during periods of high gain levels for the amplified video signal.

12. A method as claimed in claim 11 including isolating the amplified video signal through optical coupling.

13. A method as claimed in claim 12 wherein the detecting step includes detecting low current levels through the optical coupling, the low current levels representing high gain levels for the amplified video signal.

14. A method as claimed in claim 13 wherein the detecting step includes detecting a current through a resistive element and pulse stretching the output of a detected low current.

15. A method as claimed in claim 11 wherein the video signal is free of carrier modulation.

16. A method for stabilizing an unmodulated video signal having a sync tip voltage comprising amplifying the video signal according to a control voltage, detecting the sync tip voltage in the video signal and outputting a voltage derived from the sync tip voltage, comparing the voltage derived from the sync tip voltage with a reference voltage and outputting a ramping voltage as the control voltage when the voltage derived from the sync tip voltage is unequal to the reference voltage, isolating the amplified video signal through optical coupling, detecting current levels in the amplified video signal through a resistive element in series with the optical coupling and, as a consequence of low current detection, pulse stretching the output of a detected low current and outputting a signal to cause the output of a ramping voltage to reduce the gain of the amplification of the video signal, thereby stabilizing the video signal.

17. A fuel dispenser for dispensing fuel and showing video images to a fuel customer comprising a fuel dispensing apparatus including a video screen, a video transmission line to said fuel dispensing apparatus for transmitting a video signal without a carrier frequency, an amplifier for receiving and amplifying the video signal according to a control voltage, a synchronization signal detector for detecting a video level in the video signal and outputting a voltage representative of the video level, an integrator having three inputs, one of which is the voltage representative of the video level and another of which is a reference voltage and an output to said amplifier as said control voltage, a stabilization loop that detects low current levels in a circuit passing the amplified video signal and outputs a signal as the third input to said integrator, whereby said synchronization signal detector, integrator and amplifier cooperate to stabilize the video signal in most circumstances, and said stabilization loop prevents video signal voltage from increasing to too high a level for said sync tip voltage detector.

18. An apparatus for stabilizing a video signal having a sync tip voltage comprising an amplifier for receiving and amplifying the video signal according to a control voltage, a sync tip voltage detector for detecting the sync tip voltage in the video signal and outputting a voltage derived from the sync tip voltage, an automatic gain control loop having at least two inputs, one of which is the voltage derived from the sync tip voltage and an output to said amplifier as said control voltage, a secondary stabilization loop that detects high gain levels for the amplified video signal in a circuit passing the amplified video signal and outputs a signal as one of the inputs to said integrator, whereby said sync tip voltage detector, integrator and amplifier cooperate to stabilize the video signal in most circumstances, and said stabilization loop prevents video signal voltage from increasing to too high a level for said sync tip voltage detector.

* * * * *